United States Patent
Yang (10) Patent No.: US 6,272,192 B1
(45) Date of Patent: Aug. 7, 2001

(54) METHOD AND APPARATUS FOR TRANSMIT TIMING ADJUSTMENT IN A HOST-PROCESSOR-BASED MODEM

(75) Inventor: Jian Yang, Mansfield, MA (US)

(73) Assignee: Motorola Inc., Shaumburg, IL (US)

( * ) Notice: Subject to any disclaimer, the term of this patent is extended or adjusted under 35 U.S.C. 154(b) by 0 days.

(21) Appl. No.: 09/399,406

(22) Filed: Sep. 20, 1999

(51) Int. Cl.$^7$ ............... H04L 7/00; H04L 27/04
(52) U.S. Cl. ............................. 375/355; 375/295
(58) Field of Search ................... 375/295, 222, 375/377, 355, 363; 370/505; 708/313

(56) References Cited

U.S. PATENT DOCUMENTS

| | | | | |
|---|---|---|---|---|
| 5,317,596 | * | 5/1994 | Ho et al. | 375/232 |
| 5,512,898 | * | 4/1996 | Norsworthy | 375/222 |
| 5,875,229 | * | 2/1999 | Eyuboglu et al. | 375/222 |
| 5,909,463 | * | 6/1999 | Johnson et al. | 375/222 |
| 5,963,588 | * | 10/1999 | Yatim et al. | 375/222 |
| 6,035,000 | * | 3/2000 | Bingham | 375/296 |

* cited by examiner

Primary Examiner—Tesfaldet Bocure
(74) Attorney, Agent, or Firm—Kenneth A. Haas; Robert L. King (57) ABSTRACT

During operation a transmitter and receiver of a central site termination unit (TU-C) (101) are driven by a sample clock derived from a network clock source (103). A remote termination unit (TU-R) (102) operates with a free running sampling clock and acquires and tracks the network clock (103) from a downstream signal (104). The regenerated network clock is then used to drive both the receiver (107) and the transmitter (108) of the TU-R (102). In particular, the transmit samples are generated on a block by block basis using fast algorithms. To avoid glitches during data transmission caused by block processing, the data sample at the boundary of blocks of data is replaced by an interpolated value. In particular, a first order approximation to the correct value of the boundary sample is made, and the first order approximation is substituted in place of the boundary data sample of the block.

13 Claims, 6 Drawing Sheets

METHOD AND APPARATUS FOR TRANSMIT TIMING ADJUSTMENT IN A HOST-PROCESSOR-BASED MODEM

FIELD OF THE INVENTION

The present invention relates generally to host-processor-based modems and, in particular, to timing adjustment in such modems.

BACKGROUND OF THE INVENTION

In modems implementing loop-back timing (e.g., G.992.x ADSL modems), the remote receiver is synchronized to the network clock timing from the downstream signal and adjusts its transmitter such that the transmitted upstream signal arrives at the central site receiver at the same rate as the network clock. In host processor based modems where signal processing functions (including clock recovery) are done in software running on a host processor, it is desirable to keep the local analog-to-digital (A/D) and digital-to-analog (D/A) sample clock free-running. This is because any adjustment made to the hardware sampling clock is subject to operating system response delay, which is typically large in a host processing environment where the host processor is not dedicated to the modem function. In such systems, since the A/D converter and D/A converter sampling clock is not synchronized to the network clock, it is necessary to re-sample in the digital domain.

When the modulation format is Discrete Multi-Tone (DMT), samples are processed a block at a time where a block of samples forms a DMT symbol. Timing adjustments are typically done via time domain sample stuffing/deletion in conjunction with frequency domain rotation. Although computationally efficient, adjusting the transmit signal timing in such a manner often results in incorrect samples, especially for the samples at the boundary of two DMT symbols, causing a glitch in the far end modem's received signal. For example, consider a small (relative to sampling period) timing adjustment that results in the deletion of a sample from the current symbol. The current symbol will then be shortened by one sample. The shortened symbol will cause a glitch in the far-end modem's received signal. Therefore a need exists for a method and apparatus for timing adjustment in a host-processor-based modem that does not cause glitches in a far-end modem's received signal.

DETAILED DESCRIPTION OF THE PREFERRED EMBODIMENTS

To address the need for timing adjustment in a host-processor-based modem, a method and apparatus for performing timing adjustment in a host-processor based modem is disclosed herein. During operation the transmitter and receiver of a central site termination unit (TU-C) are driven by the same sample clock derived from a network clock source (103). Remote termination unit (TU-R) acquires and tracks the clock from a downstream signal via the use of a phase locked loop. The regenerated network clock is then used to drive both the receiver and the transmitter of the TU-R. The receiver and transmitter of the TU-R utilize free running sampling clock and perform re-sampling in the digital domain according to the regenerated network clock. The re-sampling is accomplished on a block by block basis via sample stuffing/deletion in conjunction with frequency domain rotation. In addition, to avoid glitches during data transmission caused by the block processing, the data sample at the boundary of two blocks of data is replaced by an interpolated value. In particular, a first order approximation to the correct value of the boundary sample is made, and the interpolated value is substituted in place of the boundary data sample. By replacing the boundary sample with an interpolated value, the transition between blocks is smoothed, greatly reducing the chances of a glitch during transmission and thereby improving the bit error rate performance of the modem.

The present invention encompasses an apparatus for transmit timing adjustment in a host-processor-based modem where data is transmitted in blocks. The apparatus comprises an interpolator having a sample as an input and outputting a modified sample if the sample exists at a boundary of a block of data. The apparatus additionally comprises a digital-to-analog (D/A) converter driven by a free-running clock, having the modified sample as an input, and outputting a D/A converted modified sample.

The present invention additionally encompasses an interpolator comprising a boundary value calculator having a last data sample in a first block of data as an input, a first data sample in a second block of data as an input, and a clock phase difference between a network clock and a local sampling clock as an input, and outputting a modified first data sample based on the last data sample, the first data sample, and the clock phase difference.

Finally, the present invention encompasses a method for transmit timing adjustment in a host-processor-based modem, where data is transmitted in blocks. The method comprises the steps of receiving a data sample from a stuffing and deletion (S/D) module wherein the data sample is a sample of a desired transmit waveform taken by a local sampling clock, determining if the data sample is from a boundary between two blocks of data, and determining a new value of the sample of data. Finally a digital-to analog (D/A) conversion is performed on the new value of the sample of data.

Figure 1:
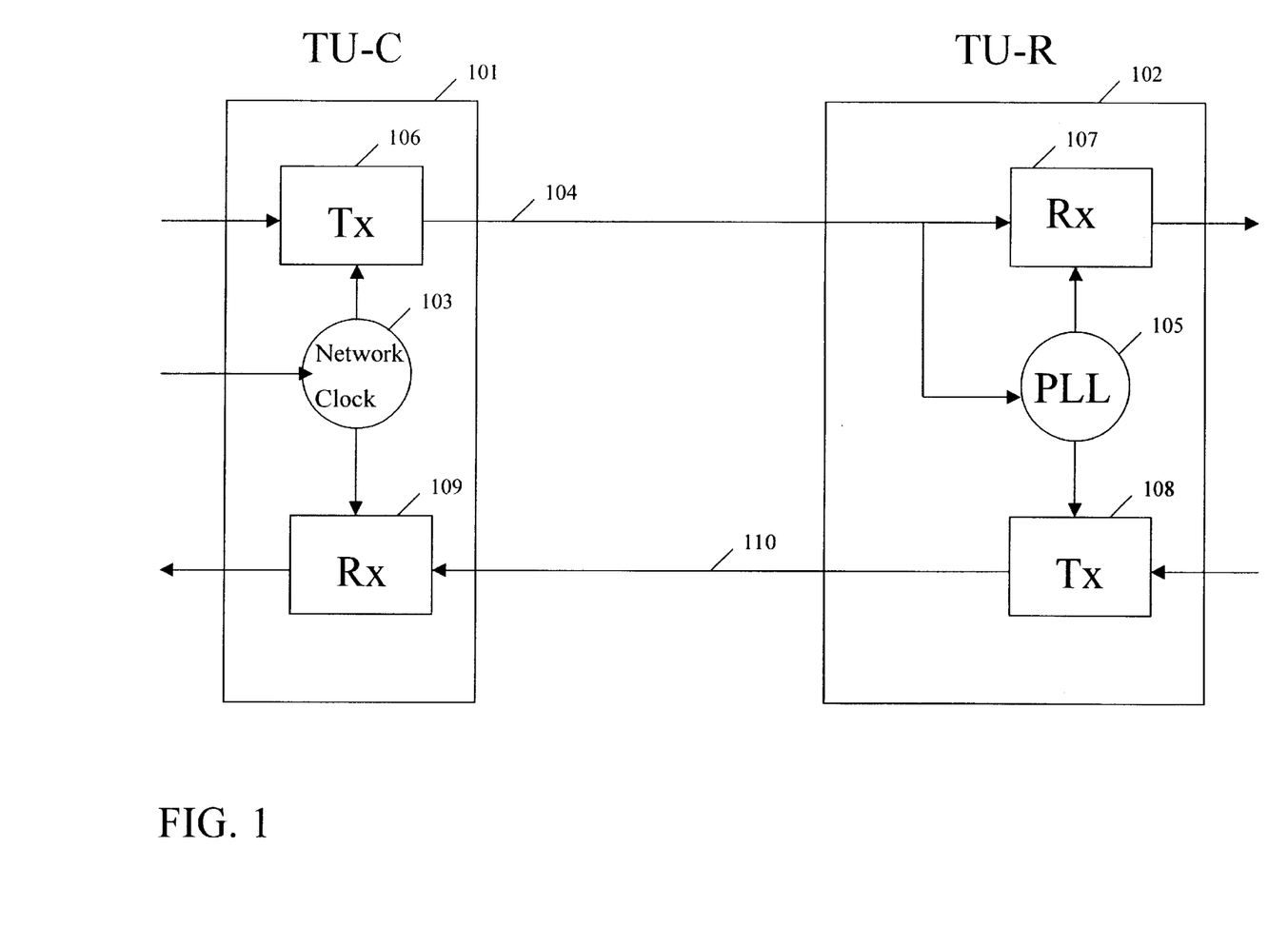
FIG. 1 is a block diagram showing a central site and a remote modem employing loop-back timing in accordance with the preferred embodiment of the present invention.

Turning now to the drawings, where like numerals designate like components, FIG. 1 is a block diagram of central site modem 101, commonly referred to as a central site termination unit (TU-C) 101 and remote modem 102, commonly referred to as a remote termination unit 102 (TU-R) 102. Modems 101 and 102 operate in full-duplex mode with the data flow from TU-C 101 to TU-R 102 being referred to as downstream and the reverse direction data flow being referred to as upstream communication. Additionally, although independent channels (104 and 110) are shown for downstream and upstream, they may be provided by the same physical media. For example, modems 101 and 102 may be of the two-wire variety each incorporating a four wire to two wire converter (known as a hybrid) communicating through a single twisted pair copper loop. It is contemplated that elements within modems 101 and 102 are configured in well known manners with processors, memories, instruction sets, and the like, that function in any suitable manner to perform the function set forth herein.

During operation TU-R 102 is responsible for maintaining loop-back timing. In other words, the transmitter and receiver of TU-C 101 are driven by same sample clock derived from network clock source 103. TU-R 102 acquires and tracks clock 103 from downstream signal 104 via the use of phase locked loop (PLL) 105. The regenerated network clock is then used to drive both receiver 107 and transmitter 108 of TU-R 102. This way, synchronization between transmitter/receiver pairs 106–107 and 108–109 for both downstream 104 and upstream 110 is guaranteed, since their sampling are all synchronized to the same network clock source 103.

In the preferred embodiment, TU-R 102 operates utilizing a free running sampling clock. TU-R 102 re-samples in the digital domain with a regenerated network clock. In this arrangement, TU-R 102 performs transmitter processing according to network clock and produces re-sampled transmit samples as samples of a desired waveform taken with the free running sampling clock. In addition, the transmit samples are generated on a block by block basis to allow computationally efficient re-sampling algorithms, such as Fourier transform based algorithms as are known in the art. With these algorithms, samples at the boundary of data blocks usually get miscalculated leading to glitches during transmission. To avoid these glitches, the boundary data sample is replaced by an interpolated value. In particular, a first order approximation to the correct value of the boundary sample is made. By replacing the boundary sample with an interpolated sample, block by block based fast re-sampling algorithms can be used without performance degradation due to the glitches at block boundaries. This is especially useful in systems with DMT modulation, as block by block based Fourier transform is already employed in the transmitter and receiver, thus Fourier transform based re-sampling can be achieved with little computational cost.

Figure 2:
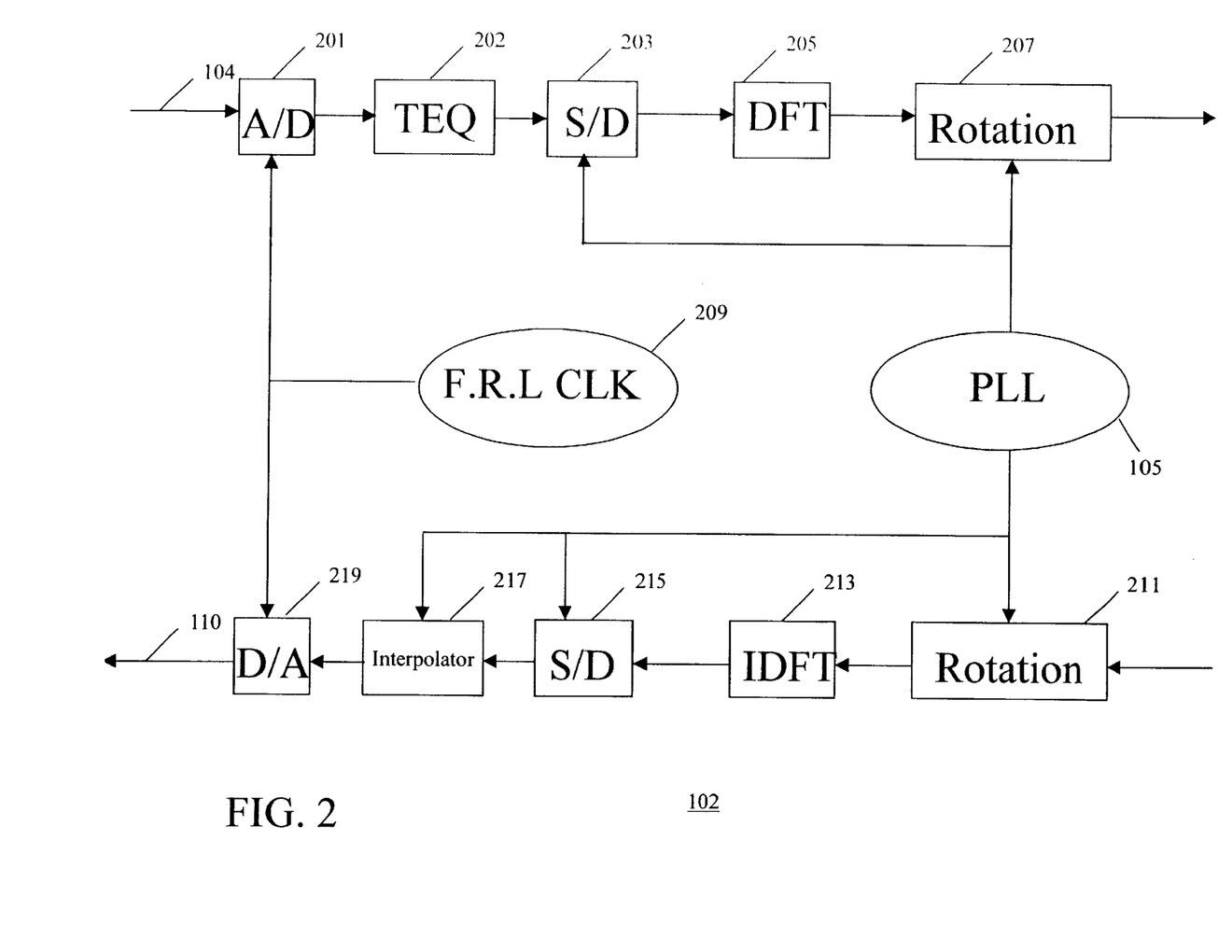
FIG. 2 is a block diagram of a remote modem incorporating a timing adjustment method in accordance with the preferred embodiment of the present invention.

FIG. 2 is a block diagram of TU-R 102 implemented on a host processor in accordance with the preferred embodiment of the present invention. Received signal 104 is time sampled by A/D converter 201 before being applied to time domain equalizer 202. A/D converter 201 outputs digital data samples to equalizer 202. Equalizer 202 is typically an FIR filter that partially undoes the dispersion of the channel. As shown, in the preferred embodiment of the present invention free-running local clock 209 drives both A/D converter 201 and D/A converter 219 sampling rate. This is in contrast to a typical implementation of a non-host processor based TU-R modem, where the A/D and D/A converters are driven by a regenerated network clock from a PLL.

In the preferred embodiment of the present invention, utilizing a host processor environment, PLL 105, like other Digital Signal Processing (DSP) functions, is implemented in software running on the host processor. For PLL 105 to control the sampling clock of A/D converter 201 and D/A converter 219, which are obviously implemented in hardware, would require extra interfaces. Such interfaces add complexity to the system whose low cost is the primary motivation for implementing the modem on a host processor. More importantly, there is typically large latency associated with the host operating system as the host processor may be running many other applications concurrently with the modem DSP functions. The large latency implies that there is a large delay between the time a sample being taken by A/D converter 201 and the time PLL 105 gets executed by the host processor to process the sample and determine its timing offset. Additionally there is a large delay in the time the clock adjustment determined by PLL 105 is received by the hardware A/D converter 201 and D/A converter 219. In other words, there is a large inherent loop delay if A/D converter 201 and D/A converter 219 sampling clock 209 is driven by PLL 105. As is well known, large loop delay leads to poor performance (large jitter) of the phase locked loop. To overcome this problem, in the preferred embodiment of the present invention A/D converter 201 and D/A converter 219 are driven by free-running local clock 209 instead of network clock 103 from PLL 105, and the receive and transmit signals are re-sampled in the digital domain (i.e., after A/D conversion and before D/A conversion).

The re-sampling of receive signal 104 is done by sample stuffing/deletion module (S/D module) 203 prior to entering discrete Fourier transformer (DFT) 205 which produces N/2 complex frequency domain samples from N real time domain samples. Additionally a frequency domain phase rotation is accomplished by rotation module 207 following DFT 205. In the transmit path, the re-sampling is accomplished via sample stuffing/deletion module 215 and frequency domain rotation module 211. It is noted that in a typical DMT modulated system, the number of samples per block (L) is typically larger than the number of samples produced by the IDFT block N. The extra samples are obtained by copying L-N samples at the end of the block and pre-pending them to the beginning of the block. This is commonly referred to as cyclic prefix. Cyclic prefixing is also performed by sample stuffing/deletion module 215 and sample stuffing/deletion module 203 is responsible for the corresponding cyclic prefix removal operation in the receiving path.

The detailed operation of the sample stuffing/deletion and frequency domain rotation is as follows. For a sample phase adjustment that is beyond the range from −T/2 to T/2, (where T is the sample period), a sample stuffing or deletion is taken based on the polarity of the adjustment. In other words, one or more samples at the end of the previous block are deleted if the local clock phase lags behind the network clock phase and one or more extra samples are inserted, typically by periodically (with period N) extending the previous block, if the local clock is ahead. This achieves a timing adjustment accuracy of within ±T/2. In the preferred embodiment of the present invention the remaining fine adjustment is done by the frequency domain rotation module that rotates each frequency bin by a complex phasor of the form $e^{-j2\pi kd/(NT)}$, where k=0, 1, ... N−1, is the index of the frequency bin and −T/2<d<T/2 is the amount of timing adjustment that needs to be made to the sample. The re-sampling of the transmit signal is done in the same manner. The sample phase adjustment of receive signal 104 and transmit signal 110 is controlled by PLL 105 in such a way that whenever a delay in receive signal 104 is applied, transmit signal 110 is advanced by exactly the same amount. Since in some DMT modulated systems, the transmit sample period may not be the same as the receive sample period, transmitter timing adjustment may require a different combination of sample stuffing/deletion and frequency domain rotation operation. In particular, the number of stuffed/deleted samples in the received path may not be equal to that in the transmit path and the rotation angle (d) of the frequency domain rotation may not be the same for receive and transmit path, but the amount of timing adjustment affected collectively by the sample stuffing/deletion and frequency domain rotation is the same for receive and transmit path. It can be shown that this is approximately equivalent to the system described above where digital domain re-sampling is replaced by PLL-controlled A/D converter and D/A converter. Since samples are processed block by block by DFT 205 and inverse DFT (IDFT) module 213, the transmit samples near the boundary of two blocks may be incorrectly computed by the digital domain re-sampling method described above. This is demonstrated in FIG. 3.

Figure 3:
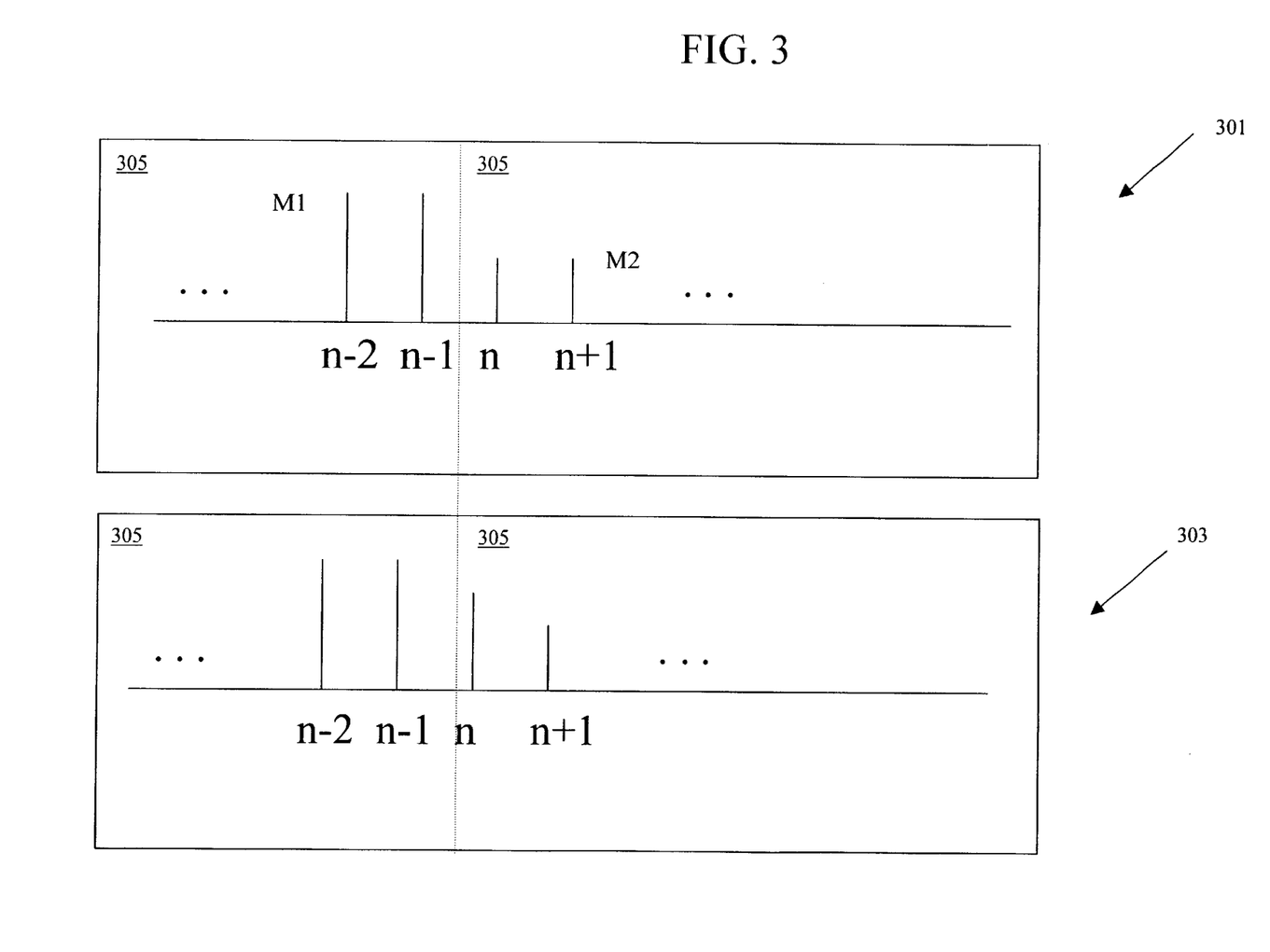
FIG. 3 illustrates the need for a correction of a sample at a boundary of two blocks.

FIG. 3 illustrates two sample sequences 301 and 303. Sample sequence 301 is generated by TU-R 102 before the digital domain re-sampling process (i.e., if the frequency domain rotation and the sample stuffing/deletion are not applied). Sample sequence 303 is what D/A converter 219 receives to generate a desired transmit signal (i.e., what the samples should be after the digital domain re-sampling process). Clearly, sample sequences 301 and 303 are samples of the same transmitted waveform at different sampling phases. In particular, samples 301 are taken utilizing network clock 103 and samples 303 are taken utilizing free-running local clock 209 that drives D/A converter 219. To aid in the description, FIG. 3 shows a simplified case where each block 305 of samples in the first sequence are of the same magnitude. It follows that the digital domain re-sampling process described above will not change the step function shape of the sample sequence (it may change the number of samples in a block, i.e. where the step occurs). However, to generate the same waveform after D/A conversion, the local clock sample sequence would need to be as shown as samples 303. In other words the nth sample (whose sample phase is between the last sample of the previous block and the first sample of the current block in the network clock sample sequence 301) should have a magnitude that is between the magnitude (M1) of the previous block and the magnitude (M2) of the current block. The re-sampling process in this case does not generate the correct sample value for sample n, as it can only generate sample n to be of magnitude of either M1 or M2. This would cause a glitch in the transmit waveform. Additionally, the nth sample is not the only sample that has a wrong value. It is conceivable that the waveform ramps down smoothly from the first block to the second block and thus n−1'th sample of samples 303 should have a slightly smaller magnitude than M1 and the n+1 sample of samples 303 should have a slightly bigger magnitude than M2, and so on. Regardless, the sample n of samples 303 has the largest error, and thus is the dominant contributor to the glitch. In the preferred embodiment of the present invention it is recognized that only a smaller number (one or two) of boundary samples suffer from miscalculation. To reduce the glitch between frame boundaries, boundary sample's (n) value is recalculated and modified by interpolator 217 using a simple linear interpolation.

Figure 4:
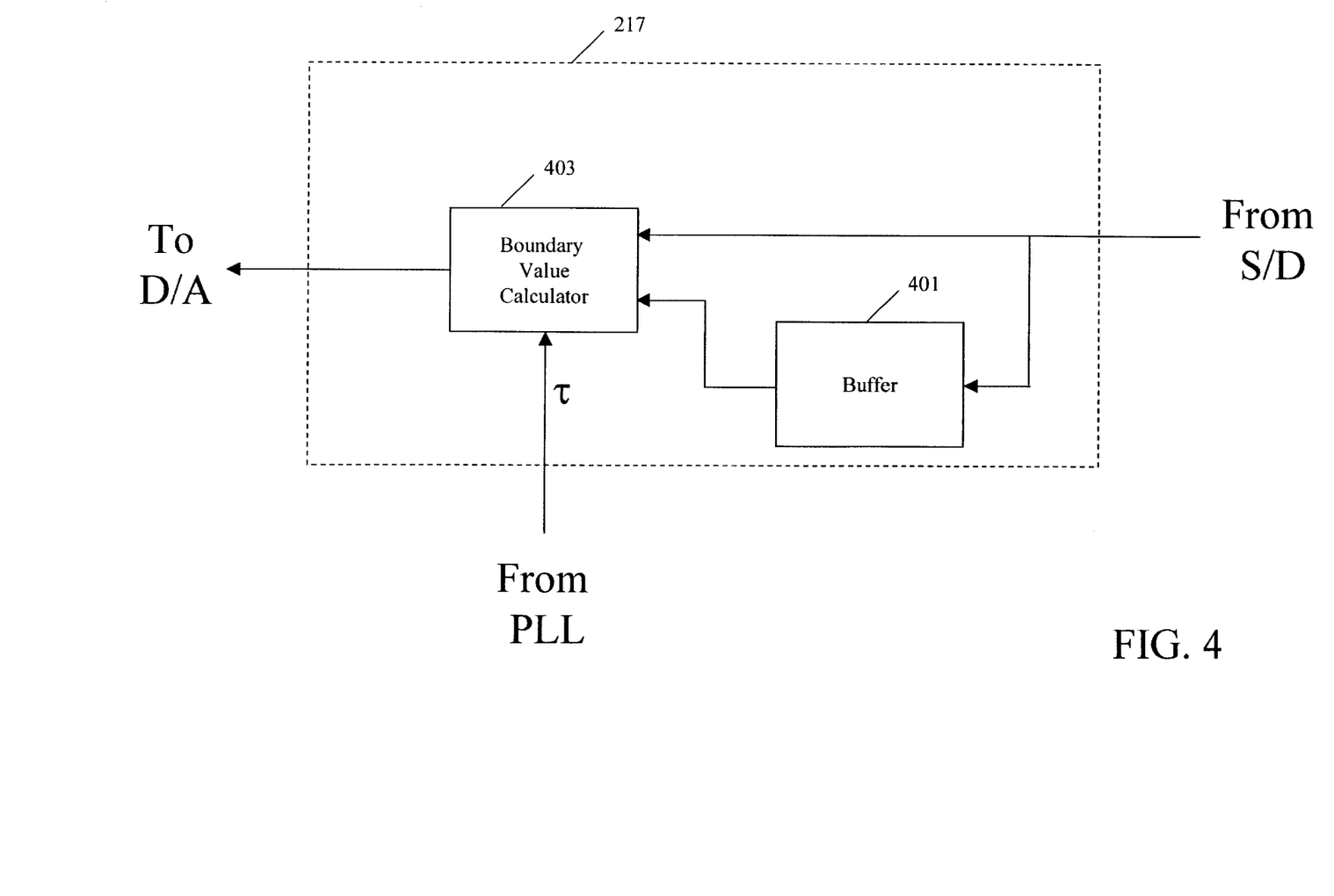
FIG. 4 is a block diagram showing a sample interpolator used to correct boundary data samples in accordance with the preferred embodiment of the present invention.

FIG. 4 is a block diagram of interpolator 217 in accordance with the preferred embodiment of the present invention. As shown in FIG. 4, interpolator 217 comprises boundary value calculator 403 and buffer 401. In the preferred embodiment of the present invention boundary value calculator 403 selects a transmit sample from the sample stuffing/deletion module. If the sample is not a boundary sample between two blocks calculator 403 passes the sample directly to D/A converter 219. If the sample is a boundary sample, an interpolated sample is calculated from this sample and a stored sample in buffer 401 based on the timing offset information from the PLL. One of the two boundary samples is replaced by the interpolated sample, and the interpolated sample is passed to D/A converter 219. In particular, calculator 403 determines which of the two boundary samples is closer in time to the boundary between the two blocks. The sample that is closest to the boundary is the sample replaced by the interpolated sample.

Buffer 401 outputs the last sample in the previous block (first block) of data to boundary value calculator 403. A boundary sample that is closest to the boundary is determined. The boundary between the two blocks of data is represented in FIG. 3 by a vertical dotted line and defined to be the exact midpoint between two blocks by the network clock. Boundary value calculator 403 determines which sample is a boundary sample based on the timing offset τ, where $-T/2 < \tau \leq T/2$ represents the clock phase difference between the network clock and the local sampling clock and is available from the PLL 105. If it is assumed that a negative τ corresponds to local sampling clock being ahead of network clock, a situation shown in FIG. 3, then the last sample of the previous block is the boundary sample whenever $\tau \geq 0$ and the first sample of the present block is the boundary sample whenever τ<0.

Once a boundary sample that is closest to the boundary between two blocks is chosen, a periodic extension of the block of data not containing the closest boundary value is determined. In particular, a trend in block of data not containing the closest boundary sample is analyzed. The trend is extended into the block of data containing the data point closest to the boundary. The periodic extension is simply the value of the trending data at the position of the data point. This is illustrated in FIG. 5.

Figure 5:
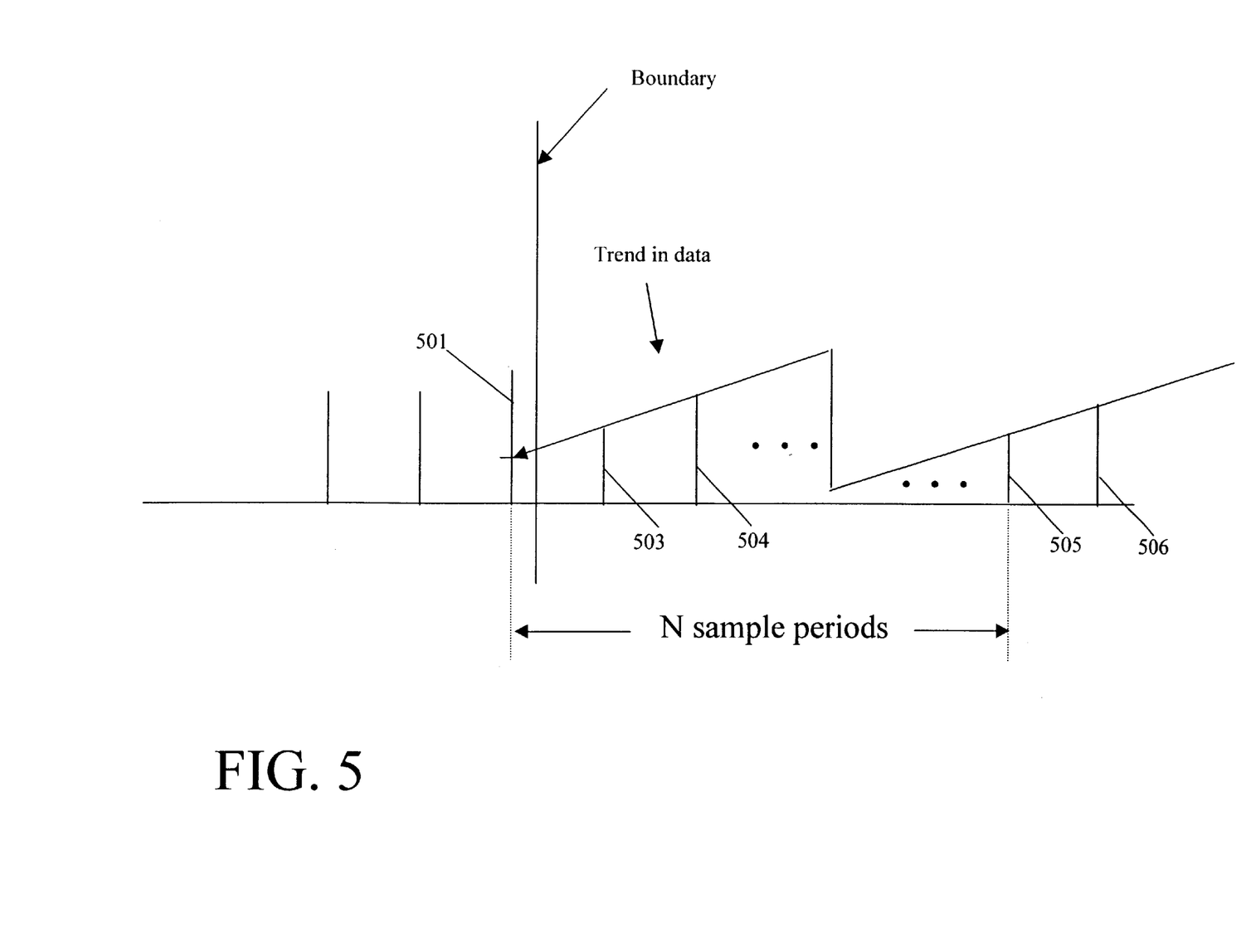
FIG. 5 is a flow chart showing operation of a sample interpolator in accordance with the preferred embodiment of the present invention.

In FIG. 5, boundary value 501 is closest to the boundary between two blocks. Calculator 403 determines the trend in data from a plurality of data points existing in a block of data not containing the boundary value to be modified (i.e., data points 503–506), and extends the trend to boundary value point 501 to determine a value at data point 501. In particular, the samples 503–506 are assumed to be periodic with period of N samples. It is known that phase rotation in frequency domain corresponds to time offset of the infinite sample sequence formed by periodically repeating the N time domain samples. Thus the trend of sample value at data point 501 as determined by the data points 503–506 equals to the sample value 505 which is spaced N sample periods from the data point 501, i.e. the trend of sample value at data point 501 is determined as a periodic extension of the data samples 503–106.

Once the periodic extension of the data at data point 501 is determined the interpolated boundary sample X'(n) is calculated according to the following equation:

For $\tau \geq 0$, $$X'(n) = (1-\tau/T)*X(n) + (\tau/T)*X(n+N),$$

For $\tau \leq 0$, $$X'(n) = (1+\tau/T)*X(n) + (-\tau/T)*X(n-N),$$

where, {X(n)} are the samples produced by the sample stuffing/deletion operation and the nth sample is the boundary sample and X(n+N) and X(n−N) are the periodic extension of the block of data not containing the boundary value point that is closes to the boundary. Note, the only requirement for sample buffer 401 is that it must be able to provide sample X(n+N) of the currently block and sample X(n−N) of the previous block. In other words, buffer 401 does not need to store entire blocks of data. Efficient implementations of such a buffer exist and can be designed by a person skilled in the art.

Operation of interpolator 217 provides a first order approximation to the correct value of the D/A converted sample that is closest to the boundary of two adjacent blocks. As pointed out earlier, this is the sample that suffers the largest error if not corrected. Consider the case when τ=0. This situation corresponds to the case when the network clock is aligned with the local clock and no correction is needed. It is easy to see that the algorithm produces the non-interpolated values. Now, consider the case when τ=½. In this case, the D/A sample is right on the boundary of two adjacent blocks. If the sampling rate is increased, then the samples before this critical sample should be from the first block or its periodic extensions. Likewise, the samples after the critical sample should be from the second block or its periodic extensions. As the sampling rate increases further to approach infinity, the value of the sample slightly ahead of the critical sample will be X(n) and the value of the sample slightly after the critical sample will be equal to X(n+N) as DMT symbols are periodic with period N. Consider two samples, one taken Δ ahead of the critical sample and one taken Δ after the critical sample. Clearly, the formula sets the critical sample value to be the average of the sample value Δ ahead and after when Δ approaches zero. It is conceivable that this is the best choice for the sample value. For general value of τ, the algorithm provides a linear (first order) approximation between the extreme cases considered above.

As an alternative embodiment of the present invention, the boundary value calculator interpolates for two samples, both the last sample of the previous block and the first sample of the current block. These are the two samples that suffer the most error if uncorrected. If the n−1'th sample is the last sample of the previous block and nth sample is the first sample of the current block, then the interpolation formula for these two samples will be the following.

For X(n−1), $$X'(n-1)=(1-|\tau|/T)*X(n-1)+(|\tau|/T)*X(n+N-1),$$

For X(n), $$X'(n)=(1-|\tau|/T)*X(n)+(|\tau|/T)*X(n-N),$$

It is also possible to apply corrections to more samples, however the performance improvement will be small as these samples are not very far from their correct values, and the complexity increase may not be justified.

Figure 6:
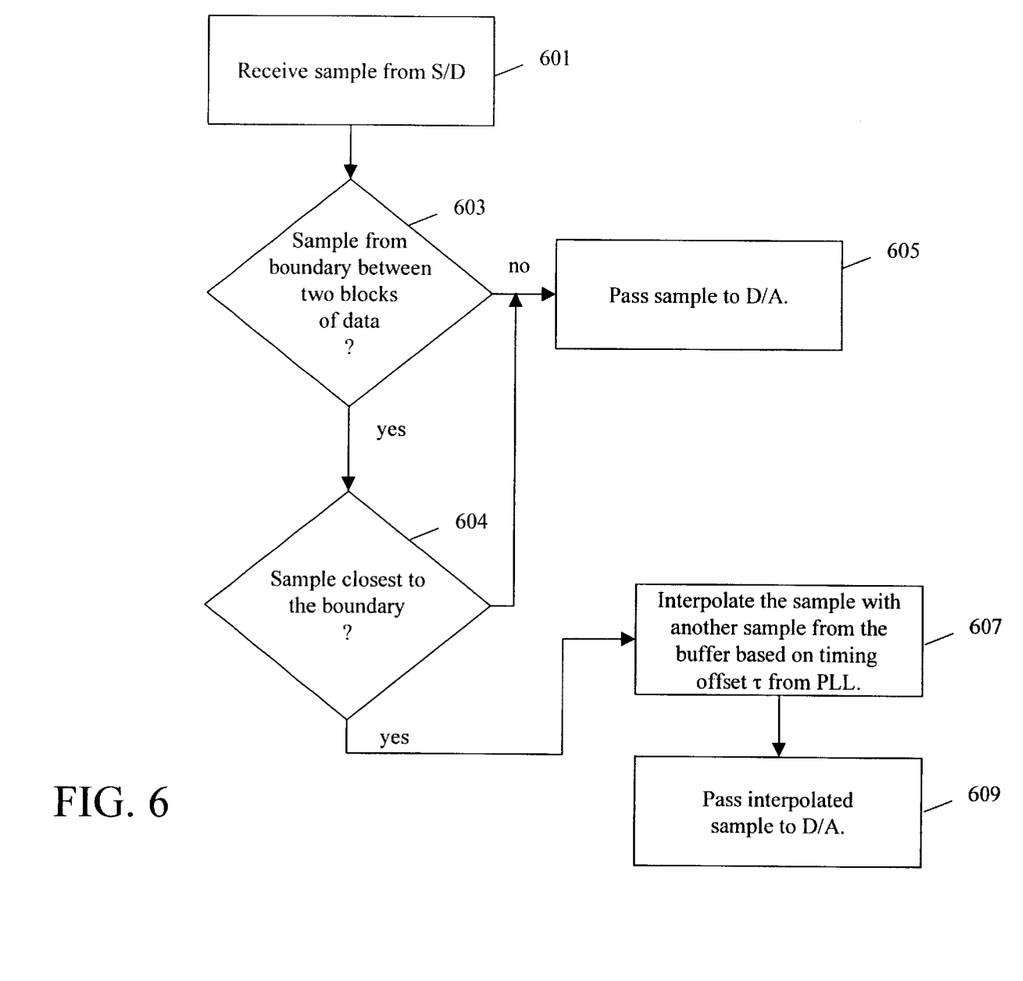
FIG. 6 is a flow chart showing operation of boundary value calculator in accordance with the preferred embodiment of the present invention.

FIG. 6 is a flow chart showing operation of boundary value calculator 403 in accordance with the preferred embodiment of the present invention. The logic flow begins at step 601 where a sample is received from S/D module 215. As discussed above, samples from S/D module 215 are samples of the desired transmit waveform taken by the local sampling clock. At step 603 interpolator 217 determines if the sample is from a boundary between two blocks of data. In particular, data is transmitted in blocks of data, on which DFT 205 and IDFT 213 perform DFT and IDFT operations. If, at step 603 it is determined that the sample is from the boundary between two blocks of data, then the logic flow continues to step 604, otherwise the logic flow continues to step 607 where the sample is passed to D/A converter 219. At step 604 it is determined if the boundary sample is the closest sample to the boundary of the two boundary samples, and if not the logic flow continues to step 607. If it is determined that the boundary sample is the closest sample to the boundary, then the logic flow continues to step 605.

At step 605, interpolator 217 determines a new (modified) value for the sample based on a plurality of data samples in the block of data not containing the boundary value to be modified (as discussed above) and passes the new value to the D/A converter. In particular, an interpolation is made according to one of the formulas described above between the boundary sample and samples from the buffer 401 based on the timing offset τ available from the PLL 105. At step 609, the interpolated sample is passed to D/A converter 219. D/A converter 219 converts the digital samples back to analog format for transmission.

The descriptions of the invention, the specific details, and the drawings mentioned above, are not meant to limit the scope of the present invention and it is the intent of the inventors that various modifications can be made to the present invention without varying from the spirit and scope of the invention. For example, although the preferred embodiment of the present invention was described above modifying a boundary value by utilizing a periodic extension of a block of data, it is contemplated by the inventors that other forms of boundary data modification can be implemented without varying from the scope of the invention. For example, a boundary value may be modified by performing a simple interpolation between the boundary value and the second boundary value from the previous block of data. It is intended that all such modifications come within the scope of the following claims and their equivalents.

What is claimed is:

1. An apparatus for transmit timing adjustment in a host-processor-based modem where data is transmitted in blocks, the apparatus comprising:
   an interpolator having a sample as an input and either: (1) outputting the sample, or (2) outputting a modified sample if the sample is one of two consecutive boundary samples at an end and a beginning of two successive blocks which is closer in time to the boundary as a result of timing offsets; and
   a digital-to-analog (D/A) converter driven by a free-running clock, having the sample or the modified sample as an input, and outputting a D/A converted sample or modified sample.

2. The apparatus of claim 1 further comprising:
   a sample stuffing and deletion module having a block of samples as an input, and outputting to the interpolator, a modified block of samples having additional samples added or deleted from the block of data.

3. An interpolator comprising:
   a boundary value calculator having a last data sample in a first block of data as an input, a first data sample in a second block of data as an input, and a clock phase difference between a network clock and a local sampling clock as an input, and outputting a modified first data sample based on a plurality of data from the first block of data, the first data sample, and the clock phase difference.

4. The interpolator of claim 3 wherein the first data sample in the second block of data was originally output from a stuffing and deletion module.

5. The interpolator of claim 3 wherein the modified first data sample comprises an interpolated value between a periodic extension of the plurality of data in the first block of data and the first data sample in the second block of data.

6. A method for transmit timing adjustment in a host-processor-based modem, where data is transmitted in blocks, the method comprising the steps of:
   receiving a data sample from a stuffing and deletion (S/D) module wherein the data sample is a sample of a desired transmit waveform taken by a local sampling clock;
   determining if the data sample is from a boundary between two blocks of data;

determining a new value of the sample of data in response to determining that the data sample is from the boundary between two blocks of data; and performing a digital-to analog (D/A) conversion on the new value of the sample of data.

7. The method of claim 6 wherein the step of receiving the data sample comprises the step of receiving a data sample from the S/D module that has previously undergone a frequency domain phase rotation.

8. The method of claim 6 wherein the step of determining if the data sample is from the boundary comprises the step of determining if the data sample is a last data sample, or a first data sample within a block of data.

9. The method of claim 6 wherein the step of determining the new value of the sample of data comprises the step of performing an interpolation to obtain the new value of the sample of data.

10. The method of claim 9 wherein the step of performing the interpolation comprises the step of performing an interpolation between a periodic extension in a block of data and a first value in a block of data.

11. The method of claim 6 wherein the step of determining the new value of the sample of data comprises the step of determining the new value of the sample of data wherein the sample of data is a closest data point to a boundary between two blocks of data.

12. An apparatus in a host-processor-based modem where data is transmitted in blocks, the apparatus comprising:

a boundary value calculator which outputs data in unmodified form with the exception of detecting a last data sample in each of the blocks and a first data sample in each successive block, if any and modifying a magnitude of at least one of the last data sample and the first data sample for transmit timing adjustment prior to outputting the data.

13. The apparatus of claim 12 wherein the boundary value calculator modifies both the last data sample and the first data sample in successive blocks of data.

* * * * *